US009201686B2

(12) United States Patent
Dey et al.

(10) Patent No.: US 9,201,686 B2
(45) Date of Patent: Dec. 1, 2015

(54) TASK EXECUTION BY IDLE RESOURCES IN GRID COMPUTING SYSTEM

(71) Applicant: Tata Consultancy Services Limited, Mumbai, Maharashtra (IN)

(72) Inventors: Swarnava Dey, West Bengal (IN); Arpan Pal, West Bengal (IN); Arijit Mukherjee, West Bengal (IN); Himadri Sekhar Paul, West Bengal (IN)

(73) Assignee: Tata Consultancy Services Limited, Mumbai Maharashtra (IN)

( * ) Notice: Subject to any disclaimer, the term of this patent is extended or adjusted under 35 U.S.C. 154(b) by 27 days.

(21) Appl. No.: 14/317,272

(22) Filed: Jun. 27, 2014

(65) Prior Publication Data

US 2015/0007185 A1    Jan. 1, 2015

(30) Foreign Application Priority Data

Jun. 27, 2013    (IN) .......................... 2180/MUM/2013

(51) Int. Cl.
 G06F 9/46    (2006.01)
 G06F 9/48    (2006.01)
 G06F 9/52    (2006.01)
 G06F 9/50    (2006.01)

(52) U.S. Cl.
 CPC ............ *G06F 9/4843* (2013.01); *G06F 9/4881* (2013.01); *G06F 9/5072* (2013.01); *G06F 9/52* (2013.01)

(58) Field of Classification Search
 CPC ................................. G06F 9/4881; G06F 9/52
 USPC .................................................. 718/102, 104
 See application file for complete search history.

(56) References Cited

U.S. PATENT DOCUMENTS

| 6,112,225 | A | 8/2000 | Kraft et al. | |
|---|---|---|---|---|
| 7,082,132 | B1 * | 7/2006 | Beshai ................. | H04Q 3/5455 370/386 |
| 8,166,096 | B1 * | 4/2012 | Odom ................... | G06F 9/5072 709/201 |
| 2012/0167101 | A1 * | 6/2012 | Kandula ............... | H04L 67/325 718/102 |
| 2012/0260081 | A1 * | 10/2012 | de Cesare ............. | G06F 9/4893 713/100 |
| 2012/0260083 | A1 * | 10/2012 | Andrews ............... | G06F 1/3228 713/100 |

OTHER PUBLICATIONS

Dey et al., "Challenges of Using Edge Devices in IoT Computation Grids", 2013.*

(Continued)

*Primary Examiner* — Phillip H Nguyen
(74) *Attorney, Agent, or Firm* — Banner & Witcoff, Ltd.

(57) ABSTRACT

Described herein, are methods and devices for execution of a task in a grid computing system. According to an implementation, free time-slots are identified and durations of the free time-slots are estimated, by an edge device, for execution of a sub-task. The free time-slots are indicative of an idle state of the edge device. At least one computation capability parameter of the edge device is determined by the edge device for execution of a sub-task during the free time-slots. An advertisement profile having at least one free time-slot, and the duration and the at least one computation capability parameter associated with the at least one free time-slot is created by the edge device. The advertisement profile is provided by the edge device to grid servers in the grid computing system for partitioning a main task to create a sub-task executable by the edge device.

18 Claims, 4 Drawing Sheets

(56) References Cited

OTHER PUBLICATIONS

Yu-tao et al., "System for Performing Resource Management and Control and Task Scheduling in Grid Computing", 2008.*

Gian Chand Sodhy et al., Design Framework of Compute Power Market for Peer-to-Peer and Grid Environments, Proceedings of the 1st International Workshop on Knowledge Grid and Grid Intelligence (KGGI'2003), Oct. 13, 2003, Department of Mathematics and Computing Science, Saint Mary's University, Halifax, Canada.

* cited by examiner

TASK EXECUTION BY IDLE RESOURCES IN GRID COMPUTING SYSTEM

TECHNICAL FIELD

The present subject matter relates to a grid computing system and, particularly but not exclusively, to task execution by idle resources in a grid computing system.

BACKGROUND

In modern day environments, computing devices, such as computers and servers, are commonly utilized for executing a variety of task. Tasks, such as data analysis, simulations, modeling and testing, may be computationally intensive and complex and it may not be possible to execute such tasks through a single computing device. Such computationally intensive tasks, for execution, are distributed over to multiple computing devices that function as computing resources.

Grid computing is one such commonly utilized technique for execution of tasks, including computationally intensive tasks. In grid computing, a computing device, to which a main task is allocated for execution, harnesses the processing power of idle computing resources to get sub-tasks of the main tasks executed by the idle computing resources.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some implementations of devices and/or methods in accordance with the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to methods and devices for task execution by idle resources in grid computing systems. Idle resources may be understood as computing devices which are in idle state, and whose processing power is unutilized and available for performing tasks.

A grid computing system generally includes one or more grid servers, referred to as dedicated resources, to which main tasks are allocated for execution. The main tasks may include data analysis tasks, simulations, modeling tasks, testing tasks, and such. A grid server may communicate with idle computing devices, referred to as non-dedicated resources, and assign sub-tasks associated with a main task to the idle computing devices. The idle computing devices execute the assigned sub-tasks and send sub-task results back to the grid server. The grid server fetches the sub-task results from the idle computing devices and aggregates them to generate the main task result.

In a grid computing system, grid servers may be responsible for finding which computing devices are idle or free for assigning sub-tasks of computationally intensive main tasks. Grid computing systems are known where the computing devices in their idle state initiate to communicate with the grid servers and demand for tasks for execution. The grid servers receive requests from the idle computing devices, and assign sub-tasks for execution.

Further, each grid server divides the computationally intensive main task into multiple data-parallel sub-tasks or partitions out some sub-tasks from the computationally intensive main task. These already created or partitioned sub-tasks are assigned to idle computing devices for execution. Conventionally, it is not determined whether the idle computing devices, to which the sub-tasks are assigned for execution, are capable of executing the assigned sub-tasks. With this, it cannot be ensured whether the assigned sub-tasks will be executed and completed by the idle computing device. Furthermore, a sub-task may be assigned with a timeline. By assigning a sub-task to an idle computing device, without the knowledge of capability of the idle computing device, it cannot be ensured whether the sub-tasks will be completed by the idle computing device within the timeline. This affects the execution and completion of the sub-tasks by the idle computing devices and, in turn, the completion of the main task assigned to the grid server.

Further, the grid servers may determine the capability of the idle computing devices before partitioning the sub-tasks and assigning the sub-tasks to the idle computing devices. With a substantially large number of computing devices, which may be idle and communicating with the grid servers for execution of sub-tasks, each grid server may have to determine the capability over the large number of computing devices coupled to the grid computing system. This will result in a substantial work load on the grid servers. Further, with a large number of grid servers managing a large number of computing device as resources, the management overhead for the gird computing system will also be substantially high.

The present subject matter relates to methods and devices for task execution by idle resources in a grid computing system. The grid computing system includes one or more grid servers functioning as dedicated resources to which at least one main task is allocated for execution, and includes one or more other computing devices functioning as non-dedicated resources, which can offer their processing power during idle states for execution of sub-tasks associated with the main task. In an implementation, the other computing device, referred to as idle resources, may include edge devices, such as mobile phones and residential gateways. An edge device is a device at a terminal of a network of the service provider with which the edge device is associated. The grid servers and the edge devices of the present subject matter are configured such that sub-tasks can be partitioned out from a main task in an efficient manner, according to computation capability of the edge devices for execution of the sub-tasks during the duration of the idle states. With this, the assignment, the execution, and the completion of the sub-tasks by the edge devices are substantially efficient in comparison to those in the conventional grid computing systems.

An edge device, in accordance with the present subject matter, keeps a track of its idle state. The idle state of the edge device, according to the present subject matter, is a state in which the edge device has processing power and device capacity to execute tasks received from external devices, such as the grid servers. The edge device is understood to be in an idle state, or a relatively idle state, while running some applications or executing some tasks in background which do not utilize substantial processing power and device capacity. In an implementation, time-slots during which the edge device is in the idle state are identified by the edge device. Such time-slots are referred to as free time-slots. For each of the free time-slots, the duration of the free time-slot is estimated by the edge device. In addition to the estimation of the durations of the free time-slots, at least one computational capability parameter of the edge device for execution of sub-tasks during the identified free time-slots is determined by the edge device. In an example, the computational capability parameters include a computation speed of the edge device, a processing memory available of the edge device, and a network bandwidth of the edge device, during the free time-slots.

Based on the identification and the determination, information of at least one free time-slot, its duration and the at least one computational capability parameter of the edge device associated with the at least one free time-slot is advertized by the edge device to grid servers in the grid computing system for partitioning of the main tasks to create sub-tasks executable by the edge device.

The grid servers, in accordance with the present subject matter, listen to advertisements from the edge devices to acquire information on free time-slots and computational capability parameters of the edge devices. In an implementation, information of at least one free time-slot, its duration, and at least one computational capability parameter of one or more edge devices, advertized by those edge devices, is received by a grid server. The grid server, upon receiving such information from each edge device, performs checks to determine whether the duration of the free time-slot is sufficient for completing a smallest sub-task by the edge device, and whether, with the at least one computational capability parameter associated with the free time-slot, the edge device is capable of executing the smallest sub-task and meeting a timeline for that sub-task.

Based on the above mentioned checks for each edge device, the grid server partitions the main task, allocated to it, to create a sub-task for execution by the each edge device. The sub-task for the each edge device is created based on the duration of the free time-slot and the computational capability parameter advertized by the edge device. The sub-tasks created for the edge devices are then assigned to the corresponding edge devices by the grid server. Each edge device receives the assigned sub-tasks, executes it, and sends the sub-task result to the grid server. The grid server collects sub-task results from all the edge devices and combines the collected results to formulate a main task result.

With the devices and the methods of the present subject matter, the edge devices estimate and advertize their availability to function as resources before taking up a computational task. This reduces the load on the grid server for finding the available idle resources. In addition, the edge devices by themselves estimate the duration of availability and capability for executing a task. This prevents from burdening the grid servers for determining the idle resource capabilities for task execution.

Further, since the grid devices partition out sub-tasks that fit the capabilities and duration of idleness of the edge devices, sub-tasks, which the edge devices are capable of executing during free time-slots, are assigned for execution. This facilitates in reducing the rate of failure of execution and completion of assigned sub-tasks, makes the completion of the main tasks substantially efficient.

These and other advantages of the present subject matter would be described in greater detail in conjunction with the following figures. It should be noted that the description and figures merely illustrate the principles of the present subject matter.

Figure 1:
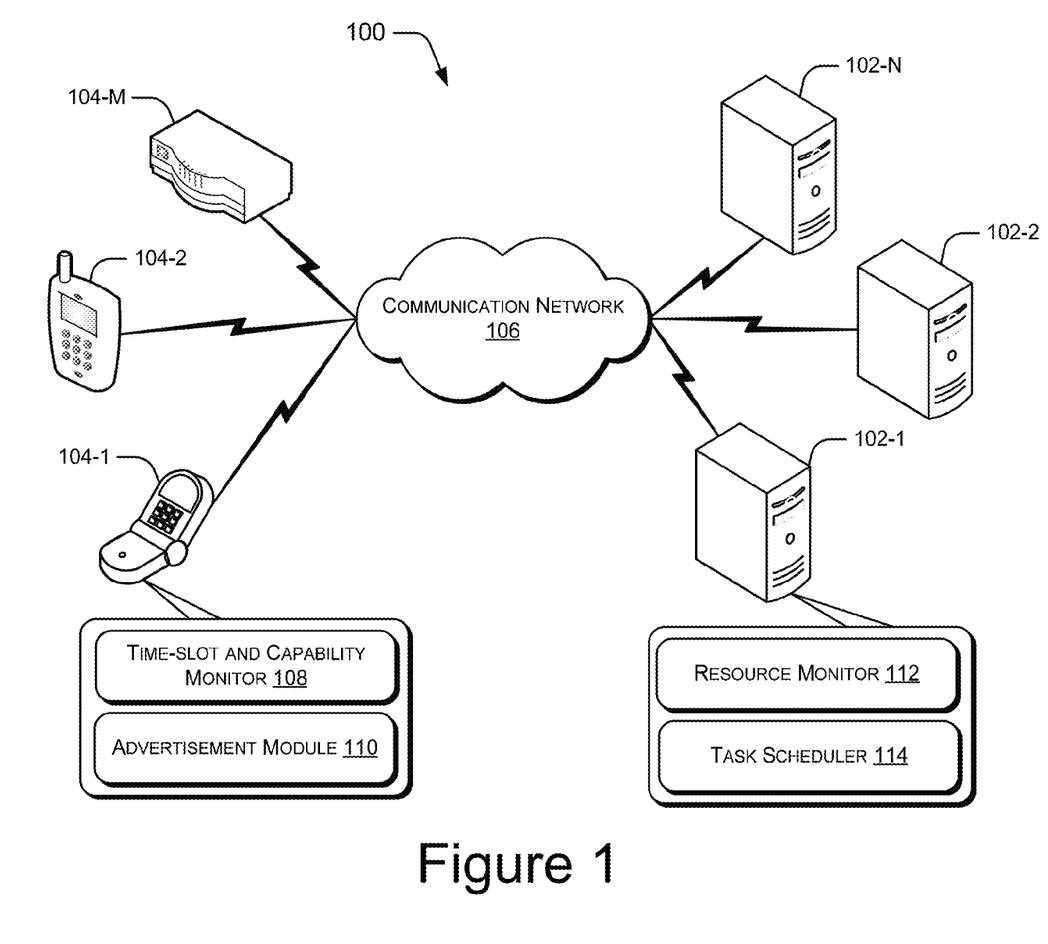
FIG. 1 illustrates a grid computing system, according to an implementation of the present subject matter.

FIG. 1 illustrates a grid computing system 100, according to an implementation of the present subject matter. The grid computing system 100 has a plurality of grid servers 102-1, 102-2, . . . , 102-N, each allocated a task, referred to as a main task, for execution. The plurality of grid servers 102-1, 102-2, . . . , 102-N, hereinafter, are collectively referred to as grid servers 102, and individually referred to as grid server 102. The main task may be allocated to the grid server 102 by an external task allocator (not shown in FIG. 1). In the grid computing system 100, multiple edge devices 104-1, 104-2, . . . , 104-M may communicatively couple with one or more of the grid servers 102 for execution of sub-tasks of the main tasks. The edge devices 104-1, 104-2, . . . , 104-M, hereinafter, are collectively referred to as edge devices 104, and individually referred to as edge device 104. The edge devices 104 include mobile devices, for example, mobile phones, tablets, and the like, and include residential gateways, for example routers, switches, modems, and the like.

The grid servers 102 and the edge devices 104 are communicatively coupled with each other over a communication network 106. In an implementation, the edge devices 104 are internet-enabled edge devices. The communication network 106 may be a wireless network, a wired network, or a combination thereof. The communication network 106 can also be an individual network or a collection of many such individual networks, interconnected with each other and functioning as a single large network, e.g., the Internet. The communication network 106 can be implemented as one of the different types of networks, such as intranet, local area network (LAN), wide area network (WAN), the internet, and such. The communication network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 106 may also include individual networks, such as but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Further, it may be understood that the communication between the edge devices 104 and the grid servers 102, and other entities may take place based on the communication protocol compatible with the communication network 106.

Further, as shown in FIG. 1, each of the edge devices 104 includes a time-slot and capability monitor 108, and an advertisement module 110. The time-slot and capability monitor 108 of the edge device 104 is configured to identify free time-slots indicative of idle state of the edge device 104. The time-slot and capability monitor 108 also estimates the duration of each of the free time-slots. In addition, the time-slot and capability monitor 108 determines one or more computational capability parameter of the edge device 104 for execution of sub-tasks during the identified free time-slots. The advertisement module 110 of the edge device 104 is configured to advertize the free time-slots, and the durations and the capability parameters of the edge device 104 associated with the free time slots, to the grid servers 102.

As shown in FIG. 1, each of the grid servers 102 includes a resource monitor 112, and a task scheduler 114. The resource monitor 112 of the grid server 102 is configured to listen to the advertisements, from the edge devices 104, having information on free time-slots and computational capability parameters. The resource monitor 112 may receive the advertized information from one or more edge devices 104. For the received information from each edge device 104, the resource monitor 112 is configured to perform checks on the sufficiency of the duration of the free time-slot for completing a smallest sub-task by the edge device 104, and the capability of the edge device 104, based on the computational capability parameters associated with the free time-slot, to execute the smallest sub-task and meeting a timeline for that sub-task. Further, the task scheduler 114 of the grid server 102 is configured to partition the main task, allocated to it, to create a sub-task based on the checks performed by the resource monitor 112. The task scheduler 114 then assigns the created sub-task to the corresponding edge device 104 for execution.

Figure 2:
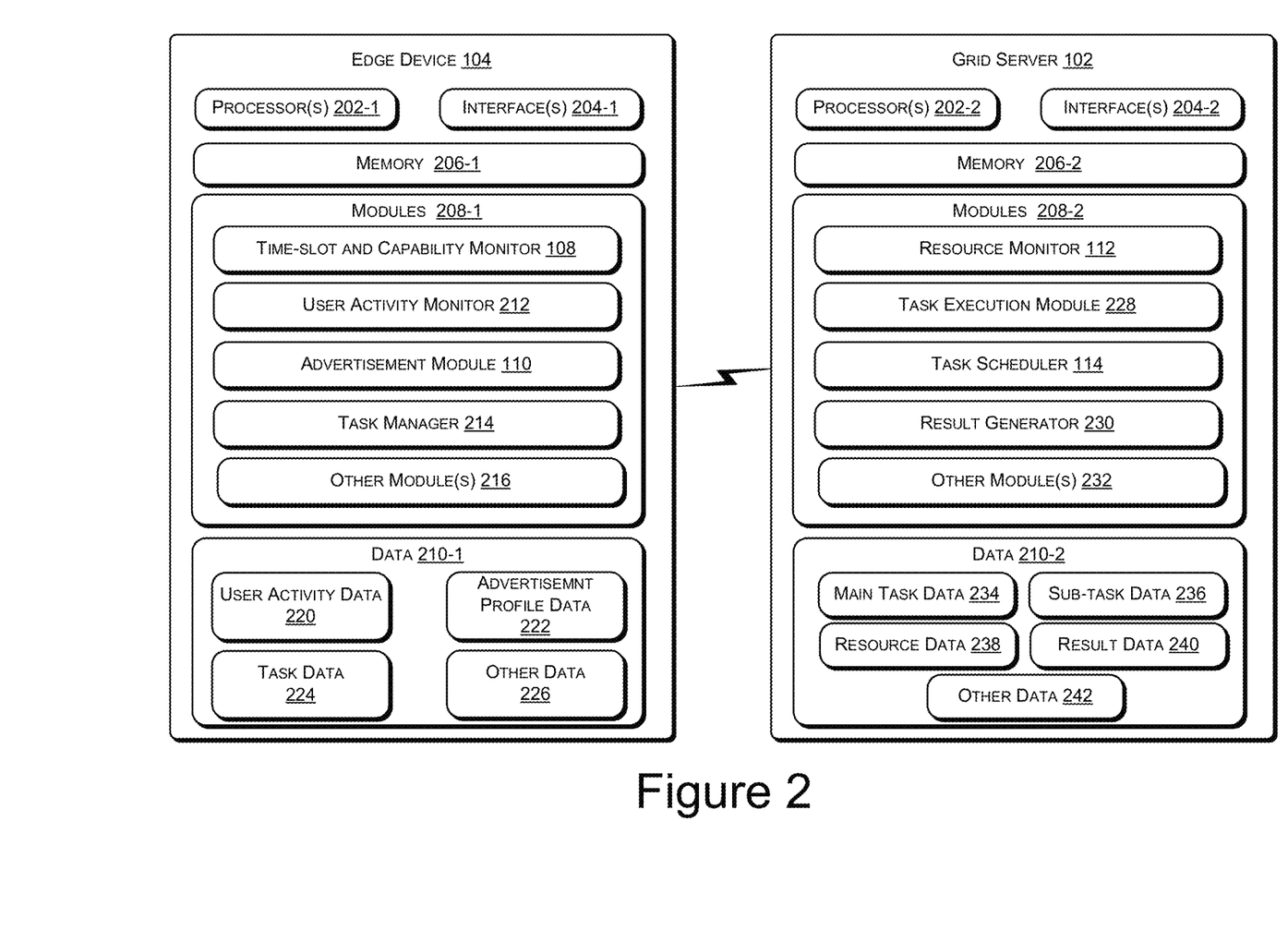
FIG. 2 illustrates an edge device and a grid server of the grid computing system, according to an implementation of the present subject matter.

FIG. 2 illustrates the edge device 104 and the grid server 102 of the grid computing system 100, according to an implementation of the present subject matter. The edge device 104 and the grid server 102 include one or more processor(s) 202-1, 202-2, interface(s) 204-1, 204-2, and memory 206-1, 206-2 coupled to the processor(s) 202-1, 202-2. The processor(s) 202-1 include edge device-based processor(s), and the processor(s) 202-2 include server-based processor(s). The processor(s) 202-1 and 202-2 are collectively referred to as processors 202. Similarly, the interface(s) 204-1 include edge device-based interface(s), and the interface(s) 204-2 include server-based interface(s). The interface(s) 204-1 and 204-2 are collectively referred to as interfaces 204. Similarly, the memory 206-1 and 206-2 include edge device-based memory and server-based memory, respectively. The memory 206-1 and 206-2 are collectively referred to as memory 206.

Each of the processors 202 can be a single processor unit or a number of units, all of which could include multiple computing units. Each of the processors 202 may be implemented as one or more microprocessors, microcomputers, microcontrollers, digital signal processors, central processing units, state machines, logic circuitries, and/or any devices that manipulate signals based on operational instructions. Among other capabilities, the processors 202 are configured to fetch and execute computer-readable instructions and data stored in the memory 206.

The interfaces 204 may include a variety of software and hardware interfaces, for example, interfaces for peripheral device(s), such as a keyboard, and an external memory. The interfaces 204 may include one or more ports to allow communication between the edge device 104 and the grid server 102. The interfaces 204 may further enable the edge device 104 and the grid server 102 to communicate with other devices, such as external computing devices and external databases.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the edge device 104 and the grid server 102, respectively, includes module(s) 208-1 and 208-2, collectively referred to as module(s) 208, and data 210-1 and 210-2, collectively referred to as data 210. The module(s) 208 may be coupled to the processor(s) 202. The module(s) 208, amongst other things, include routines, programs, objects, components, data structures, and the like, which perform particular tasks or implement particular abstract data types. The module(s) 208 further include modules that supplement applications on the edge device 104 and the grid server 102, for example, modules of an operating system. The data 210 serves, amongst other things, as a repository for storing data that may be fetched, processed, received, or generated by the module(s) 208. Although the data 210 is shown internal to the edge device 104 and the grid server 102, it may be understood that the data 210 can reside in an external repository (not shown in the figure), which may be coupled to the edge device 104 and the grid server 102. The edge device 104 and the grid server 102 may communicate with the external repository through the interface(s) 204 to obtain information from the data 210.

In an implementation, the modules 208-1 of the edge device 104 include the time-slot and capability monitor 108, a user activity monitor 212, the advertisement module 110, a task manager 214, and other module(s) 216. In an implementation, the data 210-1 of the edge device 104 include user activity data 220, advertisement profile data 222, task data 224, and other data 226. The other module(s) 216 may include programs or coded incrustations that supplement and function, for example, programs in the operating system of the edge device 104, and the other data 226 comprises data corresponding to one or more of the other module(s) 216.

Similarly, in an implementation, the modules 208-2 of the grid server 102 include a task execution module 228, the resource monitor 112, the task scheduler 114, result generator 230, and other module(s) 232. In an implementation, the data 210-2 of the grid server 102 include main task data 234, sub-task data 236, resource data 238, result data 240, and other data 242. The other module(s) 232 may include programs or coded incrustations that supplement and function, for example, programs in the operating system of the grid server 102, and the other data 242 comprises data corresponding to one or more of the other module(s) 232.

The following description describes task execution in the grid computing system 100. For the sake of simplicity, the communication between one grid server 102 and one edge device 104 is described for the execution of a computationally intensive main task allocated to the grid server 102, in accordance with the present subject matter. It will be understood that the concepts thereto may be extended to communications between multiple edge devices 104 and one grid server 102, or between multiple edge devices 104 and multiple grid servers 102, for the execution of computationally intensive main tasks.

In an implementation, the edge device 104 may take consent of a user of the edge device 104 for the purpose of joining the grid computing system 100 and offering its processing power in the idle states. The edge device 104 may receive an input from the user in respect of user consent. Based on the user consent, the edge device 104 may proceed to determine idle periods of the edge device 104 for joining the grid computing system 100.

In an implementation, the user activity monitor 212 monitors activities being performed on the edge device 104 by the user, and determines lean and high activity periods. The activities may include web-browsing, social networking, communication-based activities, taking photos, making videos, and such. A lean activity period is a period in which the user activities being performed on the edge device 104 leave the processing power and capacity, i.e., one or more of computational capability parameters, including the processing speed, processing memory available, available network bandwidth, or a combination thereof, of the edge device 104 above respective predefined threshold levels. Similarly, a high activity period is a period in which the user activities being performed on the edge device 104 leave the processing power and capacity, i.e., one or more of computational capability parameters, including the processing speed, processing memory available, available network bandwidth, or a combination thereof, of the edge device 104 below respective predefined threshold levels. Based on the monitoring, the user activity monitor 212 maintains a history of user activity on the edge device 104 and a history of lean and high activity periods. In an implementation, the user activity monitor 212 may maintain the history of user activity on time-slot basis. The history maintained by the user activity monitor 212 may be used to determine the idle periods of the edge device 104. The information with respect to user activity is stored in the user activity data 220. The user activities may be monitored by reading system states of the edge device 104. In an implementation, the user activity monitor 212 may seek permission of the user to read the system states.

In an implementation, where the edge device 104 is a mobile phone or a tablet, the user activity monitor 212 may estimate the user activity based on a usage pattern of the user of the edge device 104. For this, the user activity monitor 212 provides a questionnaire to the user of the edge device 104, where the questionnaire includes questions seeking information on the usage pattern from the user. The questions with respect to the usage pattern may be displayed on the edge device 104, and the user may then have to provide responses to the questions. The user may respond with details of his activities, activity schedules, heavy usage hours, schedule of running media applications, social networking, web-browsing, and such, on the edge device 104. The user activity monitor 212 fetches the user responses and evaluates the user responses to determine the usage pattern of the user of the edge device 104. Based on the usage pattern, the user activity on the edge device 104 may be estimated. The information with respect to usage pattern is stored in the user activity data 220.

For joining the grid computing system 100, the time-slot and capability monitor 108 identifies free time-slots in which the processing power of the edge device 104 is not utilized in user activities and is substantially available for grid computing. The free time-slots are identified based on the information of the user activity and/or the usage pattern maintained by the user activity monitor 212. In an implementation, the free time-slots may be identified from the time-slots with user activity maintained by the user activity monitor 212.

The time-slot and capability monitor 108 may identify one or more free time-slots. Based on the identified free time-slots, the time-slot and capability monitor 108 estimates the duration of each of the free time-slots. The duration of a free time-slot is understood to be a predicted or predictable duration, as the user may initiate an activity on the edge device 104 during the otherwise free time-slot.

In addition, the time-slot and capability monitor 108 determines one or more computational capability parameters of the edge device 104 during the identified free time-slot. The computational capability parameter includes a computation speed of the edge device, a processing memory available of the edge device, and a network bandwidth of the edge device. Such parameters can be determined based on the history of user activity, activity periods, and/or usage pattern during the free time-slot.

In an implementation, where the edge device 104 is a mobile phone or a tablet, the user activity monitor 212, before identifying the free time-slots, may determine an available battery charge on the edge device 104. The available charge is determined to know whether the edge device 104 has substantially sufficient charge for task execution during the free time-slots. In case the available charge is not sufficient or below a predefined value, the time-slot and capability monitor 108 may wait for the edge device 104 to charge sufficiently or above the predefined value before identifying the free time-slots.

Further, in an implementation, before identifying the free time-slots, the user activity monitor 212 may determine whether any application is currently running on the edge device 104. This is determined to know whether the edge device 104 is currently occupied in performing activity associated with the running application. The applications may include web-browser, social networking widgets, word processors, communication-based applications, and such. In case one or more applications are running that leave the processing power and capacity, i.e., one or more of computational capability parameters, including the processing speed, processing memory available, available network bandwidth, or a combination thereof, of the edge device 104 below respective predefined threshold levels, the time-slot and capability monitor 108 may wait for the edge device 104 to be free from or stop that application(s) before identifying the free time-slots.

Further, based on the free time-slots and the computational capability parameters of the edge device 104, the advertisement module 110 creates a profile for advertising information of free time-slots and computational capability parameters for that free time-slot. The profile may be referred to as an advertisement profile. The advertisement profile includes information of at least one free time-slot, the duration of that free time-slot, and the computational capability parameters determined for that free time-slot. In an implementation, the advertisement profile further includes information of the available charge of the edge device 104, where the edge device 104 is a mobile phone or a tablet. The data associated with advertisement profile is stored in the advertisement profile data 222.

After creating the advertisement profile, the advertisement module 110 advertizes the free time-slots and capability parameters. For this, the advertisement module 110 provides the advertisement profile to grid servers 102 in the grid computing system 100. In an implementation, the edge device 104 may search for grid servers 102 for sending the advertisement profile. In an implementation, the edge device 104 may have a cached list with details of a plurality of grid servers 102, with which the edge device 104 may have communicated previously. The advertisement module 110 may multicast the advertisement profile to the grid servers 102 based on the cached list.

In the grid server 102, the task execution module 228 may receive the main task allocated to the grid server 102 for execution. The main task may be allocated by an external entity. The data associated with the main task is stored in the main task data 234. With the main task being a computationally intensive task, the grid server 102 looks for edge devices 104 having free time-slots and capability to execute portions, i.e., sub-tasks, of the main task. For this, the resource monitor 112 listens to the advertisement profiles advertised by the edge device 104. The resource monitor 112 may receive the advertisement profiles of one or more edge devices 104, which may be processed for partitioning the main task to create sub-tasks for the edge devices 104.

Based on the advertisement profile received from the edge device 104, the resource monitor 112 checks for the duration of the free time-slot and the computational capability parameters associated with the free time-slot in the advertisement profile. It is checked whether the duration is above predefined threshold duration for completing a smallest sub-task of the main task. In addition, it is checked whether the computational capability parameters are above corresponding predefined threshold values for meeting a timeline for the smallest sub-task of the main task. In an example, if the duration of the free time-slot is below the predefined threshold duration for completing the smallest sub-task and/or if the computational capability parameters are below the corresponding predefined threshold values for meeting the timeline for the smallest sub-task, the advertisement profile and the edge device 104 is ignored by the grid server 102 for distribution of a sub-task. Based on the checks performed, the resource monitor 112 may select the edge device 104 for task assignment. The data associated with the selected edge device 104 is stored in the resource data 238.

Further, based on the checks performed by the resource monitor 112, the task scheduler 114 partitions the main task to create a sub-task for the edge device 104, and assigns the created sub-task to the selected edge device 104 for execution. The sub-task is created such that its size and computational requirements fit the computational capabilities of the edge device 104 and can be executed within a predefined timeline associated with that sub-task. In an example, the resource monitor 112 may receive advertisement profiles from multiple edge devices 104. Based on the checks for the advertisement profile, if it is determined that more than one edge device 104 are capable of performing a sub-tasks, then the resource monitor 112 may select more than one edge device 104 for assigning a sub-task to each selected edge device 104, and the task scheduler 114 may partition the main task to create a separate sub-task suitable for each of the edge devices 104. The sub-tasks may be created such that the overall timeline of the main task is met. It may be understood that the left-over tasks of the main task may be executed by the grid server 102. The data associated with the sub-tasks is stored in the sub-task data 236.

In an implementation, where the advertisement profile includes the information of available charge in the edge device 104, the resource monitor 112 may check the amount of available charge. It may be checked whether the available charge is above a predefined threshold charge value for completing a smallest sub-task of the main task. If the available charge is below the predefined threshold charge value, then the advertisement profile and the edge device 104 may be ignored for sharing a sub-task for execution.

Further, the assigned sub-task is executed by the edge device 104. For this, in an implementation, the edge device 104 may have to authenticate itself with the grid server 102 before taking up the sub-task for execution. An authentication mechanism, for example, a password based authentication check, may be implemented between the edge device 104 and the grid server 102. The grid server 102 may check the credentials of the edge device 104 and the allocated password before allowing the edge device 104 to proceed to execute the assigned sub-task.

Based on the authentication, the task manager 214 of the edge device 104 receives the sub-task created based on the advertisement profile of the edge device 104, from the grid server 102, for execution during the free time-slot. In an example, the task manager 214 may download the assigned sub-task. The task manager 214 executes the sub-task and sends a sub-task result to the grid server 102. The data associated with the sub-task and the sub-task result is stored in the task data 224.

Further, in an implementation, the grid server 102 may select and assign sub-tasks to multiple edge devices 104. The task scheduler 114 in the grid server 102 may monitor the edge devices 104 to gather a completion status of sub-tasks. The monitoring may be done through polling-based mechanism. Further, in an implementation, the task scheduler 114 may maintain timelines of each of sub-tasks assigned to individual edge devices 104. For each assigned sub-task, the task scheduler 114 may identify a sub-task completion deadline. If the sub-task completion deadline is missed by an edge device 104, the resource monitor 112 may release that edge device 104, and the task scheduler 114 may merge the corresponding sub-task with the main task for execution by the grid server 102.

In an implementation, based on monitoring of the edge devices 104 by the grid server 102, if any edge device 104 is found to be busy in a user activity or an application run by the user, or is not reachable, the resource monitor 112 may release that edge device 104, and the task scheduler 114 may merge the corresponding sub-task with the main task for execution by the grid server 102.

Further, the result generator 230 of the grid server 102 collects the sub-task results from the edge devices 104 to which sub-tasks are assigned. The result generator 230 collates the sub-task results along with the results of the left-over main task, executed in the grid server 102, to generate a main task result. The data associated with the sub-task results and the main task result is stored in the result data 240. The result generator 230 may then send the main task result to the entity that has allocated the main task to the grid server 102.

In an implementation, the edge devices 104 involved in sub-task execution may earn credits or get paid according to the executed sub-task. For this, the grid server 102 may store information related to contribution of each of the edge devices 104 in performing the overall main task. In an example, the contributions may be in terms of percentages of the main task or the type or level of sub-tasks. The grid server 102 may communicate with a billing system (not shown), and provide the contribution of each edge device 104. The billing system may be an external entity configured to remunerate the edge devices 104. The billing system may determine the credits or remuneration amounts for the edge device 104.

With the grid computing system 100, where the sub-tasks are created for the edge devices 104 based on their individual capabilities, and based on the duration of free time-slots, the size or the level of the sub-task for each edge device 104 may be created to optimize the cost saving or cost incurred.

In an implementation, the user of the edge device 104 may provide an input to stop or pause sharing or offering of idle processing power to the grid servers 102 in the grid computing system 100 and take part in execution of a sub-task. With this, based on the input of the user, the advertisement module 110 of the edge device 104 stops sending the advertisement profile to the grid servers 102. The user may also provide an input for resuming the sharing of idle processing power to the grid servers 102, based on which the advertisement module 110 may resume the provisioning of the advertisement profile to the grid servers 102. This pausing or stopping may affect the plan of the grid servers 102 for assigning the sub-task, and may affect in earning of credits or remuneration by the edge device 104. The stopping of the sharing of the idle processing power may be temporary or permanent. For this, the user may be provided with an option to stop providing the advertisement profile temporarily or permanently. In an implementation, in case of permanent stoppage, the details of the edge device 104 in the grid server 102 and the billing system may be deleted.

Figure 3:
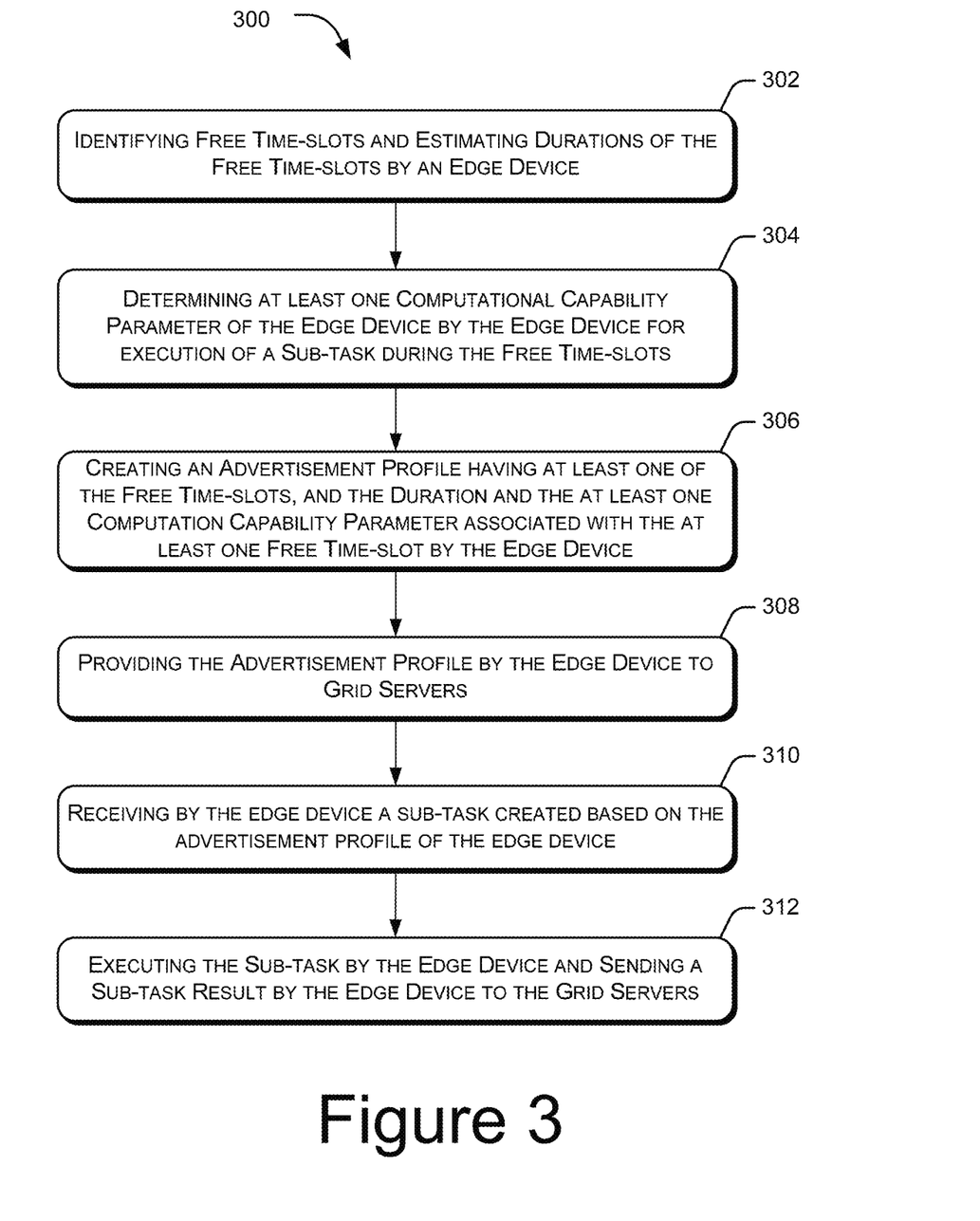
FIG. 3 illustrates a method for task execution by idle resources in a grid computing system, according to an implementation of the present subject matter.
Figure 4:
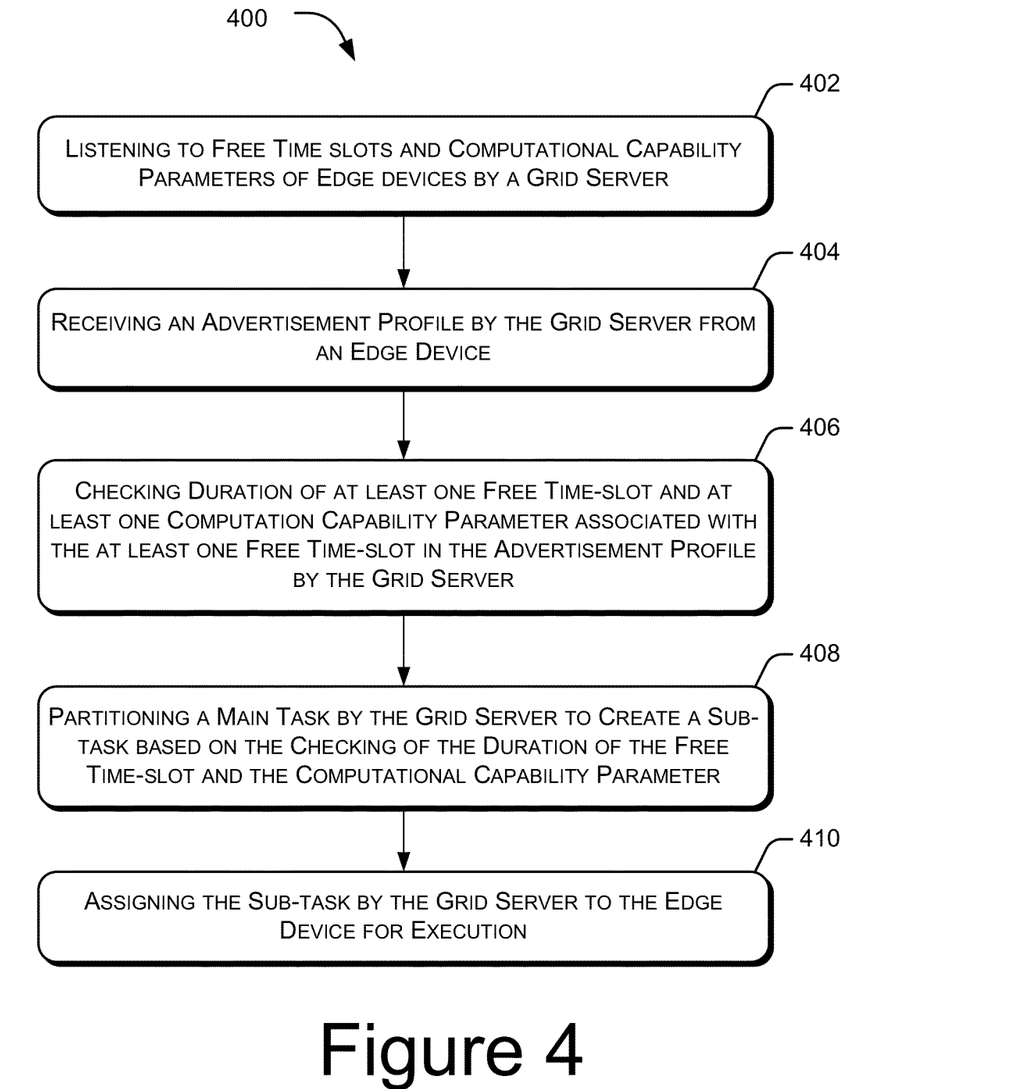
FIG. 4 illustrates a method for task execution by idle resources in a grid computing system, according to an implementation of the present subject matter.

FIG. 3 and FIG. 4 illustrate methods 300 and 400 for task execution by idle resources in a grid computing system, according to an implementation of the present subject matter. The order in which the methods 300 and 400 are described is not intended to be construed as a limitation, and any number of the described method blocks can be combined in any order to implement the methods 300 and 400, or an alternative method. Additionally, individual blocks may be deleted from the methods 300 and 400 without departing from the spirit and scope of the subject matter described herein.

Furthermore, the methods 300 and 400 can be implemented by processor(s) or computing devices in any suitable hardware, non-transitory machine readable instructions, or combination thereof. It may be understood that steps of the methods 300 and 400 may be executed based on instructions stored in a non-transitory computer readable medium as will be readily understood. The non-transitory computer readable medium may include, for example, digital data storage media, digital memories, magnetic storage media, such as a magnetic disks and magnetic tapes, hard drives, or optically readable digital data storage media.

Further, although the methods 300 and 400 may be implemented in any computing device; in an example described in FIG. 3 and FIG. 4, the methods 300 and 400 are explained in context of the aforementioned grid computing system 100, for the ease of explanation.

Referring to FIG. 3, at block 302, free time-slots are identified and durations of the free time-slots are estimated by an edge device 104 for execution of a sub-task in the grid computing system 100. The free time-slots are indicative of the idle state of the edge device 104. At block 304, at least one computational capability parameter of the edge device 104 is determined by the edge device 104 for execution of a sub-task during the free time-slots. The computational capability parameter includes a computation speed, an available memory, and a network bandwidth during the free time-slots.

In an implementation, the free time-slots are identified and the computational capability parameter is determined based on a history of user activity of the edge device 104 and lean and high activity periods of the edge device 104. For this, the edge device 104 maintains a history of user activity on the edge device 104 and details of high and lean activity periods. In an implementation, the free time-slots are identified and the computational capability parameter is determined based on usage pattern of the edge device 104. For this, user response to a questionnaire may be received by the edge device 104 and usage pattern may be determined from the user responses.

Further, at block 306, an advertisement profile having at least one of the free time-slots, and the duration and the at least one computation capability parameter associated with the at least one free time-slot is created by the edge device 104. In an implementation, the advertisement profile may also include an available charge on the edge device 104.

At block 308, the advertisement profile is provided or advertised by the edge device 104 to grid servers 102 in the grid computing system 100. The advertisement profile is provided such that a grid server 102 can partition a main task to create a sub-task executable by the edge device 104 based on the duration of the free time-slot and the computational capability parameter in the advertisement profile. In an implementation, the edge device 104 may multicast the advertisement profile to the grid servers 102 based on a cached list in the edge device 104.

At block 310, the sub-task created based on the advertisement profile of the edge device 104 is received by the edge device 104. For receiving the sub-task the edge device 104 may have to authenticate itself with the grid server 102. At block 312, the sub-task is executed by the edge device 104 and a sub-task result is sent by the edge device 104 to the grid server 102.

Referring to FIG. 4, at block 402, a grid server 102 listens to free time-slots and computational capability parameters of the edge devices 104 for execution of sub-tasks in the grid computing system 100. At block 404, an advertisement profile is received by the grid server 102 from an edge device 104. The advertisement profile has at least one free time-slot indicative of an idle state of the edge device 104, duration of the at least one free time-slot, and at least one computation capability parameter of the edge device 104, associated with the at least one free time-slot.

Based on the received advertisement profile, at block 406, the duration of the at least one free time-slot and the at least one computation capability parameter associated with the at least one free time-slot are checked by the grid server 102. It is checked whether the duration of the at least one free time-slot is above a predefined threshold duration for completing a smallest sub-task by the edge device 104, and whether the at least one computation capability parameter associated with the at least one free time-slot is above a corresponding predefined threshold value for meeting a timeline for the smallest sub-task by the edge device 104.

At block 408, the main task, allocated to the grid server 102, is partitioned by the grid server 102 to create a sub-task based on the checking of the duration of the free time-slot and the computational capability parameter. The sub-task is created for the edge device 104 such that the level of the sub-task is within the computational capability parameters of the edge device 104, and the sub-task is completed by the edge device 104 within the duration of the free time-slot.

At block 410, the sub-task, created for the edge device 104, is assigned by the grid server 102 to the edge device 104 for execution. The grid server 102 may authenticate the edge device 104 before transferring the assigned sub-task. Further, the grid server 102 may monitor the edge device 104 to gather a completion status of sub-task. Once the sub-task is completed by the edge device 104, the grid server 102 fetches the sub-task result from the edge device 104 and generates a main task result for the allocated main task.

Although implementations for the methods and the devices have been described in language specific to structural features, it is to be understood that the invention is not necessarily limited to the specific features described. Rather, the specific features are disclosed and explained in the context of a few implementations for the methods and the devices.

Other advantages of the methods and the devices of the present subject matter will become better understood from the description and claims of an exemplary implementation of the methods and the devices. The methods and the devices of the present subject matter are not restricted to the implementations that are mentioned above in the description.

Although the subject matter has been described with reference to specific implementations, this description is not meant to be construed in a limiting sense. Various modifications of the disclosed implementations, as well as alternate implementations of the subject matter, will become apparent to persons skilled in the art upon reference to the description of the subject matter. It is therefore contemplated that such modifications can be made without departing from the spirit or scope of the present subject matter as defined.

We claim:

1. A method for execution of a task in a grid computing system, the method comprising:
   identifying free time-slots and estimating durations of the free time-slots, by an edge device, for execution of a sub-task, wherein the free time-slots are indicative of an idle state of the edge device;
   determining, by the edge device, at least one computation capability parameter of the edge device for execution of a sub-task during the free time-slots;
   creating, by the edge device, an advertisement profile comprising at least one free time-slot, from amongst the free time-slots, and comprising the duration and the at least one computation capability parameter associated with the at least one free time-slot; and
   providing, by the edge device, the advertisement profile to grid servers in the grid computing system for partitioning a main task to create a sub-task executable by the edge device.

2. The method as claimed in claim 1, wherein the at least one computation capability parameter comprises a computation speed, an available memory, and a network bandwidth during the free time-slots.

3. The method as claimed in claim 1, wherein the providing the advertisement profile comprises multicasting the advertisement profile to the grid servers based on a cached list in the edge device.

4. The method as claimed in claim 1 further comprising:
   receiving, by the edge device from a grid server, the sub-task created based on the advertisement profile;
   executing the sub-task; and
   sending a sub-task result to the grid server.

5. The method as claimed in claim 1 further comprising pausing of provisioning of the advertisement profile to the grid servers, by the edge device, based on a user input for pausing.

6. The method as claimed in claim 1 further comprising maintaining a history of user activity on the edge device, and activity periods with the user activity which leave the at least one computational capability parameter of the edge device above and below respective predefined threshold levels, wherein the identifying of the free time-slots and the determining of the at least one computation capability parameter is based on the history of the user activity on the edge device and the activity periods.

7. The method as claimed in claim 1 further comprising fetching, by the edge device, user responses to a questionnaire comprising questions with respect to usage pattern of the edge device, wherein the identifying of the free time-slots and the determining of the at least one computation capability parameter is based on the usage pattern from the user responses to the questionnaire.

8. The method as claimed in claim 1 further comprising determining an available charge on the edge device for execution of the sub-task during the free time-slots, wherein the advertisement profile comprises the available charge.

9. A grid server for executing a task in a grid computing system, the grid server comprising:
   a processor;
   a resource monitor coupled to the processor, to
      receive an advertisement profile from an edge device, wherein the advertisement profile comprises at least one free time-slot indicative of an idle state of the edge device, duration of the at least one free time-slot, and at least one computation capability parameter of the edge device, associated with the at least one free time-slot; and
      check whether the duration of the at least one free time-slot is above a predefined threshold duration for completing a smallest sub-task by the edge device and whether the at least one computation capability parameter associated with the at least one free time-slot is above a corresponding predefined threshold value for meeting a timeline for the smallest sub-task by the edge device; and
   a task scheduler coupled to the processor, to partition a main task to create a sub-task for execution by the edge device, wherein the sub-task is created based on the duration of the at least one free time-slot and the at least one computation capability parameter associated with the at least one free time-slot.

10. The grid server as claimed in claim 9, wherein the resource monitor listens to free time-slots and computation capability parameters of edge devices.

11. The grid server as claimed in claim 9, wherein the resource monitor selects the edge device based on the checking of the duration of the at least one free time-slot and the at least one computation capability parameter associated with the at least one free time-slot, and wherein the task scheduler assigns the sub-task created for execution to the selected edge device.

12. The grid server as claimed in claim 11, wherein the advertisement profile comprises an available charge of the edge device, and wherein the resource monitor selects the edge device is based on the available charge.

13. The grid server as claimed in claim 11, wherein the task scheduler identifies a sub-task completion deadline of the sub-task assigned to the edge device, and wherein the resource monitor releases the edge device when the sub-task completion deadline is missed.

14. The grid server as claimed in claim 13, wherein, when the sub-task completion deadline is missed, the task scheduler merges the sub-task, assigned to the edge device, with the main task for execution by the grid server.

15. The grid server as claimed in claim 11, wherein the resource monitor releases the edge device when the edge device is one of busy in a user activity and not reachable.

16. The grid server as claimed in claim 15, wherein, when the edge device is one of busy in a user activity and not reachable, the task scheduler merges the sub-task, assigned to the edge device, with the main task for execution by the grid server.

17. A non-transitory computer readable medium having embodied thereon a computer program for executing a method of execution of a task in a grid computing system, the method comprising:
   identifying free time-slots and estimate durations of the free time-slots for execution of a sub-task, wherein the free time-slots are indicative of an idle state of an edge device;
   determining at least one computation capability parameter of the edge device for execution of a sub-task during the free time-slots;
   creating an advertisement profile comprising at least one free time-slot, from amongst the free time-slots, and comprising the duration and the at least one computation capability parameter associated with the at least one free time-slot; and
   providing the advertisement profile to grid servers in the grid computing system for partitioning a main task to create a sub-task executable by the edge device.

18. The non-transitory computer readable medium as claimed in claim 17, wherein the method further comprises:
- receiving the advertisement profile from the edge device by one of the grid servers;
- checking whether the duration of the at least one free time-slot is above a predefined threshold duration for completing a smallest sub-task by the edge device, and whether the at least one computation capability parameter associated with the at least one free time-slot is above a corresponding predefined threshold value for meeting a timeline for the smallest sub-task by the edge device; and
- partitioning a main task to create a sub-task based on the checking, for execution by the edge device.

* * * * *